United States Patent Office
3,450,520
Patented June 17, 1969

3,450,520
METHOD FOR DESTROYING UNDESIRABLE PLANT LIFE
Sidney B. Richter, Chicago, Ill., assignor to Velsicol Chemical Corporation, Chicago, Ill., a corporation of Illinois
Filed June 30, 1965, Ser. No. 468,559
The portion of the term of the patent subsequent to Oct. 31, 1984, has been disclaimed
Int. Cl. A01n 9/36, 5/00; C07f 9/16
U.S. Cl. 71—87                                  4 Claims

ABSTRACT OF THE DISCLOSURE
A compound of the formula

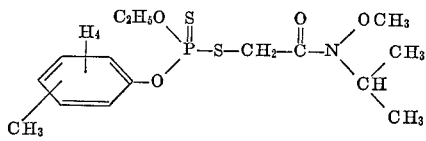

useful for destroying undesirable plant life.

---

This invention relates to new chemical compositions of matter. More particularly, this invention relates to new chemical compounds having the formula

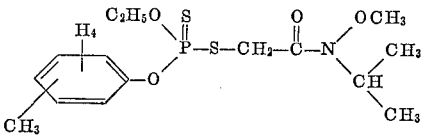

It has now been found that the compounds of the present invention are unexpectedly effective in controlling undesirable plant life. Surprisingly, the compounds of this invention are practically harmless to many important crop plants, such as corn, cotton, rice, wheat, and the like, while they are unexpectedly effective in controlling weeds commonly found in areas where these and other crops are grown.

The compounds of the present invention are: O-m-tolyl O-ethyl S-(N-methoxy - N-isopropylcarbamylmethyl)dithiophosphate, O-o-tolyl O-ethyl S-(N-methoxy-N-isopropylcarbamylmethyl)dithiophosphate, and O-p-tolyl O-ethyl S-(N-methoxy-N-isopropylcarbamylmethyl)dithiophosphate.

These new compounds can be prepared readily by reacting the corresponding ammonium or alkali metal O-tolyl O-ethyl phosphorodithioate with N-methoxy-N-isopropyl alpha-haloacetamide, wherein the halo is chlorine or bromine. This latter compound can be prepared from an α-haloacetyl halide, such as α-chloroacetyl chloride, by treatment with N-methoxy-N-isopropylamine. The ammonium or alkali metal O-tolyl O-ethyl phosphorodithioate can be prepared by treating thiophosphoryl trichloride with ethanol and then with the corresponding cresol to yield O-tolyl O-ethyl thiophosphoryl chloride, and finally with ammonium or alkali metal hydrosulfide. The hydrosulfide can be formed in situ from ammonium or alkali metal hydroxide, or the alkali metal, with hydrogen sulfide.

The manner in which the compounds of the present invention can be prepared is illustrated in the following examples.

EXAMPLE 1

Preparation of O-m-tolyl O-ethyl S-(N-methoxy-N-isopropylcarbamylmethyl)phosphorodithioate O-ethyl thiophosphoryl dichloride (40 g.; 0.22 mol) was cooled to 20° C. A solution of m-cresol (21 g.; 0.2 mol) dissolved in a solution of sodium hydroxide (10 g.; 0.25 mol) in water (38 g.) was added with stirring to the O-ethyl thiophosphoryl dichloride over a period of 30 minutes while the temperature of the mixture was maintained at 25–30° C. The resulting mixture was maintained at 30° C. and stirred vigorously over a period of 30 minutes. The organic layer was separated, washed once with a 15% aqueous potassium hydroxide solution (100 ml.) and twice with water, and dried under vacuum, finally at 65° C. for 3 hours. The residue was the desired O-m-tolyl O-ethyl thiophosphoryl chloride having a refractive index of 1.5394 at 28° C. and a chlorine content of 14.74% as compared to a calculated value of 14.2%.

Potassium hydroxide (7 g.) was dissolved in methanol (50 ml.), saturated with hydrogen sulfide and cooled. O-m-tolyl O-ethyl thiophosphoryl chloride (12.5 g.; 0.05 mol), prepared above, was added with stirring to the cooled solution prepared above. The solution was heated to reflux with stirring for 3 hours and then cooled and filtered free of precipitated potassium chloride. The filtrate was stripped of solvent by heating gently in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 18 hours, cooled, and filtered free of potassium chloride. The filtrate was washed twice with water, dried over anhydrous magnesium sulfate, filtered and heated at 65° C. in vacuo to remove the benzene solvent. The residue was the desired product O-m-tolyl O-ethyl S-(N-methoxy-N-isopropylcarbamylmethyl)phosphorodithioate having a refractive index of 1.5326 at 25° C. and the following elemental analysis as calculated for $C_{15}H_{24}NO_4PS_2$. Theoretical (percent): N, 3.7; P, 8.2. Found (percent): N, 3.58; P, 8.04.

EXAMPLE 2

Preparation of O-p-tolyl O-ethyl S-(N-methoxy-N-isopropylcarbamylmethyl)phosphorodithioate O-ethyl thiophosphoryl dichloride (40 g.; 0.22 mol) was cooled to 20° C. A solution of p-cresol (21 g.; 0.2 mol) dissolved in a solution of sodium hydroxide (10 g.; 0.25 mol) in water (38 g.) was added with stirring to the O-ethyl thiophosphoryl dichloride over a period of 30 minutes while the temperature of the mixture was maintained at 20–25° C. The resulting mixture was maintained at about 30° C. and stirred vigorously over a period of 30 minutes. The organic layer was separated, washed once with a 15% aqueous potassium hydroxide solution (100 ml.) and twice with water, and dried under vacuum, at 65° C. for 3 hours. The residue was the desired O-p-tolyl O-ethyl thiophosphoryl chloride having a refractive index of 1.5400 at 23° C. and a chlorine content of 14.33% as compared to a calculated value of 14.2%.

Metallic sodium (2.3 g.; 0.1 mol) was dissolved in methanol (100 ml.) saturated with hydrogen sulfide and cooled. O-p-tolyl O-ethyl thiophosphoryl chloride (12.5 g.; 0.05 mol), prepared above, was added with stirring to the cooled solution prepared above. The solution was heated to reflux with stirring for 3 hours and then cooled and filtered free of precipitated sodium chloride. The filtrate was stripped of solvent by heating in vacuo. Benzene was added near the end of the heating to assure complete removal of the methanol solvent. The residue was placed in a 250 ml., three-neck flask to which benzene (100 ml.) and N-methoxy-N-isopropyl-α-chloroacetamide (8 g.; 0.05 mol) were added. The resulting mixture was heated to reflux with stirring for 18 hours, cooled, and filtered free of sodium chloride. The filtrate was washed twice with water, dried over anhydrous magnesium sulfate, filtered and heated at 65° C. in vacuo to remove the benzene solvent. The residue was the desired product O-p-tolyl O-ethyl S-(N-methoxy-N-isopropylcarbamylmethyl)phosphorodithioate having a refractive index of 1.5314 at 20° C. and the following elemental analysis as calculated for $C_{15}H_{24}NO_4PS_2$. Theoretical (per cent): N, 3.7; P, 8.2. Found (per cent): N, 3.68; P, 7.83.

EXAMPLE 3

Preparation of O-o-tolyl O-ethyl S-(N-methoxy-N-isopropylcarbamylmethyl)phosphorodithioate O-ethyl thiophosphoryl dichloride (40 g.; 0.22 mol) was cooled to 20° C. A solution of o-cresol (21 g.; 0.2 mol) dissolved in a solution of sodium hydroxide (10 g.; 0.25 mol) in water (38 g.) was added with stirring to the O-ethyl thiophosphoryl dichloride over a period of 30 minutes while the temperature of the mixture was maintained at 20–25° C. The resulting mixture was maintained at about 30° C. and stirred vigorously over a period of 30 minutes. The organic layer was separated, washed once with a 15% aqueous potassium hydroxide solution (100 ml.) and twice with water, and dried under vacuum, at 65° C. for 3 hours. The residue was the desired O-o-tolyl O-ethyl thiophosphoryl chloride and after filtering through filter-aid had a refractive index of 1.5422 at 23° C. and a chlorine content of 15.20% as compared to a calculated value of 14.2%.

Potassium hydroxide (7 g.) was dissolved in methanol (50 ml.) and saturated with hydrogen sulfide. O-o-tolyl O-ethyl thiophosphoryl chloride (12.5 g.; 0.05 mol), prepared above, was added with stirring to the cooled solution prepared above. The solution was heated to reflux with stirring for 3 hours and then cooled and filtered free of precipitated potassium chloride. The filtrate was stripped of solvent by heating in vacuo. Benzene was added near the end of the heating to assure complete removal of the methanol solvent. The residue was placed in a three-neck flask to which benzene (100 ml.) and N-methoxy-N-isopropyl-α-chloroacetamide (8 g.; 0.05 mol) were added. The resulting mixture was heated to reflux with stirring for 18 hours, cooled, and filtered free of potassium chloride. The filtrate was washed twice with water, dried over anhydrous magnesium sulfate, filtered and heated at 65–70° C. in vacuo to remove the benzene solvent. The residue was the desired product O-o-tolyl O - ethyl S - (N - methoxy - N-isopropylcarbamylmethyl)-phosphorodithioate having a refractive index of 1.5295 at 27° C. and the following elemental analysis as calculated for $C_{15}H_{24}NO_4PS_2$. Theoretical (percent): N, 3.7; P, 8.2. Found (per cent): N, 3.88; P, 7.98.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

The active compounds are sufficiently soluble in common organic solvents such as kerosene or xylene so that they can be used directly as solutions in these solvents. Solutions of these compounds can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 4

Preparation of a dust:
   Product of Example 1 ---------------------- 10
   Powdered talc ---------------------------- 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers; spreaders; deactivators; adhesives; stickers; fertilizers; activators; synergists; and the like.

The compounds of the present invention are also useful when combined with other herbicides and/or defoliants, desiccants, growth inihibitors, and the like, in the herbicidal compositions heretofore described. These other materials can comprise from about 5% to about 95% of the active ingredients in the herbicidal compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), and the like; carbamate herbicides such as IPC, CIPC, swep, barban, and the like; thiocarbamate and dithiocarbamate herbicides such as CDEC, metham sodium, EPTC, diallate, PEBC, and the like; substituted urea herbicides such as dichloral urea, fenuron, monuron, diuron, linuron, nebron, and the like; symmetrical triazine herbicides such as simazine, chlorazine, atrazine, trietazine, simetone, prometone, propazine, ametryne, and the like; chloroacetamide herbicides such as α-chloro-N,N-dimethylacetamide, CDEA, α-chloro-N-isopropylacetamide, 4-(chloroacetyl)morpholine, 1-(chloroacetyl)piperidine, and the like; chlorinated aliphatic acid herbicides such as TCA, dalapon, 2,3-dichloropropionic acid, and the like, chlorinated benzoic acid and phenylacetic acid herbicides such as 2,3,6-TBA, 2,3,5,6-TBA, dicamba, tricamba, amiben, fenac, 2-methoxy-3,6-dichlorophenylacetic acid, 3-methoxy-2,6-dichlorophenylacetic acid, 2-methoxy-3,5,6-trichlorophenylacetic acid, and the like; and such compounds as O,S-dimethyl tetrachlorothioterephthalate, methyl 2,3,5,6 - tetrachloro-N-methoxy-N-methylterephthalamate, 2-[(4 - chloro - o - tolyl)oxy] - N - methoxyacetamide, aminotriazole, phenyl mercuric acetate, endothal, biuret, technical chlordane, dimethyl 2,3,5,6 - tetrachloroterephthalate, diquat, erbon, DNC, DNBP, dichlobenil; DPA, diphenamid, dipropalin, trifluralin, solan, dicryl, merphos, DMPA and the like. Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, houndstongue, moth mullein, and purple star thistle; or perennials such as while cockle, perennial rye-grass, quackgrass, Johnson grass, Canada thistle, hedge bindweed, Bermuda grass, sheep sorrel, curly dock, nutgrass, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing. In one pre-emergence test, emulsifiable concentrates or solutions prepared as heretofore described can be extended with water or oil or other suitable extenders, to obtain various concentrations of the active compound. These concentrates are sprayed on the surface of soil which had been seeded less than twenty-four hours earlier with weed seeds. After spraying the soil containers are maintained under normal lighting conditions and supplied with heat as required and daily or more frequent watering. The weeds are observed for about 7 to about 20 days, and the degree of injury to the weeds is recorded.

To demonstrate the post-emergence activity of the compounds of this invention, emulsifiable concentrates or solutions of various concentrations of the aforementioned active compounds are sprayed on the foliage of weeds that have attained a prescribed size. After spraying, the weeds are maintained under normal lighting conditions and supplied with heat as required. The soil in which the weeds are growing is watered daily or more frequently. The weeds are observed periodically for up to 14 days or more, and the severity of injury to the weeds is recorded.

The utility of the compounds of this invention in controlling weeds was demonstrated by experiments. In one series of experiments, the compounds, formulated as aqueous emulsions of acetone solutions containing emulsifiers, were sprayed at a concentration of 2 pounds actual chemical per acre on the surface of soil which had been seeded less than twenty-four hours earlier with seeds of crop plants and weeds. After spraying, the soil containers were placed in the greenhouse and provided with normal light and supplementary heat as required and daily or more frequent watering. The type and severity of injury to each crop and weed were determined 15 and 20 days after the soil treatments and compared to control plots treated with the same formulations without the essential active compounds. The severity of injury was rated on a scale of from 0 to 10, with 0 denoting no injury and 10 denoting total death of the plant. The results of this series of experiments are presented below:

| Test compound product of— | Injury ratings | | | | | |
|---|---|---|---|---|---|---|
| | Weed species | | | Beneficial plants | | |
| | Crab-grass | Barn-yard grass | Foxtail | Cotton | Rice | Saf-flower |
| Example 1 | 9 | 9 | 9 | 0 | 0 | 0 |
| Example 2 | 9 | 8 | 9 | 0 | 0 | 0 |
| Example 3 | 9 | 9 | 9 | 0 | 0 | 0 |
| Control | 0 | 0 | 0 | 0 | 0 | 0 |

I claim:

1. A method for destroying undesirable plant life which comprises applying to said plant life a herbicidal composition comprising an inert carrier and as the essential active ingredient, in a quantity which is toxic to said plant life, a compound of the formula

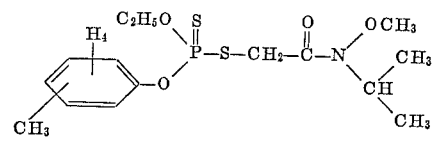

2. The method of claim 1 wherein the compound is O-m-tolyl O-ethyl S - (N-methoxy-N-isopropylcarbamylmethyl)dithiophosphate.

3. The method of claim 1 wherein the compound is O-p-tolyl O-ethyl S - (N-methoxy-N-isopropylcarbamylmethyl)dithiophosphate.

4. The method of claim 1 wherein the compound is O-o-tolyl O-ethyl S - (N-methoxy-N-isopropylcarbamylmethyl)dithiophosphate.

References Cited
UNITED STATES PATENTS

| 3,092,541 | 6/1963 | Beriges | 167—22 |
| 3,102,023 | 8/1963 | Sbeziale et al. | 71—2.7 |
| 3,370,108 | 2/1968 | Richter | 71—87 |

JAMES O. THOMAS, JR., *Primary Examiner.*

U.S. Cl. X.R.

260—943